United States Patent

[11] 3,620,924

| [72] | Inventors | Muerner S. Harvey<br>Kowloon, Hong Kong;<br>Frederick W. Viebrock, Staten Island, N.Y. |
|---|---|---|
| [21] | Appl. No. | 812,347 |
| [22] | Filed | Apr. 1, 1969 |
| [45] | Patented | Nov. 16, 1971 |
| [73] | Assignee | Baxter Laboratories Inc.<br>Morton Grove, Ill. |

[54] PRODUCTION OF ACID-ACTIVE LACTASE
16 Claims, No Drawings

[52] U.S. Cl. .................................................... 195/66 R, 195/62
[51] Int. Cl. .................................................... C07g 7/028
[50] Field of Search .......................................... 195/31, 57, 62, 63, 66, 68

[56] References Cited
UNITED STATES PATENTS

| 2,809,113 | 10/1957 | Stimpson et al. | 195/57 X |
| 3,075,886 | 1/1963 | Cayle | 195/66 |
| 3,134,723 | 5/1964 | Corman | 195/66 |
| 3,355,361 | 11/1967 | Lesuk | 195/62 |

OTHER REFERENCES

Colomick, et al., Methods in Enzymology, Academic Press Inc., N.Y. Vol. 1 1955 (pages 94–98). QP601c72

Nishizawa, K., The Enzymic Cleavage of Galactosides, Chemical Abstracts, Vol. 47, 1953 (11272b) QD1A51

Miwa, et al., Formation of Glycosidases in Molds with Special Reference to the Specificity, Chemical Abstracts, Vol. 47 1953 (1788e) QD1A51

*Primary Examiner*—A. Louis Monacell
*Assistant Examiner*—D. M. Naff
*Attorney*—Walter C. Kehm

ABSTRACT: The production of an acid-active, acid-stable lactase enzyme preparation by cultivating *Aspergillus Niger* under aerobic fermentation conditions, extracting the growth product with water, adsorbing the extract with a hydrated aluminum silicate adsorbent at a pH of 3 to 6 and releasing an active lactase component therefrom by adjusting the pH to 7 to 8.

PRODUCTION OF ACID-ACTIVE LACTASE

This invention relates to lactase and, more particularly, to the production of an acid-active, acid-stable lactase enzyme preparation suitable for the hydrolysis of lactose in acid media.

Whole milk normally contains about 5 percent lactose. Milk and products derived from milk which contain lactose, for example, butter, cheese, whey, nonfat milk solids, ice cream, and the like, have long been used as important nutrient components of human or animal diets. While whole milk constitutes a particularly large proportion of the normal infant ration, milk and milk-containing products also provide a substantial complement to the usual adult diet.

Lactose, or milk sugar, is a disaccharide carbohydrate which is hydrolyzed during the digestive process to glucose and galactose. This hydrolysis is catalyzed by the enzyme lactase, or beta-galactosidase. Although this enzyme is normally present in the intestinal juices and mucosa, recent investigations have shown that a significant portion of the human population is lactose intolerant or lactase deficient. Kern et al., *J. Am. Med. Ass'n.*, Vol. 195, pp. 927-30 (1966), Consequently, there is a need for a dietary supplement of lactose-hydrolyzing lactase enzymes in these individuals.

Lactose-hydrolyzing lactose enzymes are known to be produced by various yeasts, bacteria and fungi. Among the organisms heretofore disclosed as useful for this purpose are yeasts such as *Saccharomyces fragilis*, *Torula cremoris* and *Torula utilis*, bacteria such as *Escherichia coil* and *Lactobacillus bulgaricus*, fungi such as *Aspergillus oryzae*, *Asperigillus flavus* and *Aspergillus Niger*, and various other micro-organisms such as those described in U.S. Pat. No. 2,681,858, 2,781,266 and 2,809,113. The lactase enzyme preparations produced by these organisms generally have pH optimums on the alkaline side or in the weakly acid pH range of about 5-7. Yeasts, which are the primary source of commercial lactases, are known to produce lactases having pH optimums of about 7. Most of these conventional lactase enzyme preparations contain other enzymes in admixture therewith, for example, proteases and amylases, which are the predominant components in the mixture.

In the stomach the gastric fluid provides strongly acidic conditions in the pH range of about 1 to 3. Therefore, the activity of lactase enzyme preparations which are generally highly effective in alkaline or weakly acidic media are for the most part destroyed or inactivated when contacted with the gastric fluid.

In the copending application of Cayle, U.S. Ser. No. 812,348, filed concurrently herewith, an acid-active, acid-stable lactase enzyme preparation suitable for oral ingestion and for the hydrolysis of lactose in acid media is disclosed. This enzyme preparation is stable in the range of pH 2-9, exhibits at least about 90 percent of its activity at pH 2.5-5.0 and contains at least about 50,000 Lactase Units (LU) per gram of enzyme preparation. The disclosure of said enzyme preparation in said copending application is incorporated herein by reference.

It is an object of the present invention to provide a method for the production of a lactase enzyme preparation of the type described in said copending application of Cayle.

In accordance with the present invention, and acid-active, acid-stable lactase enzyme preparation is produced by growing a culture of *Aspergillus Niger* under aerobic fermentation conditions, extracting the growth product with water, slurring the extract with a hydrated aluminum silicate adsorbent at a pH of from about 3 to about 6 to adsorb an active lactase component, separating the precipitate and releasing the active lactase component therefrom by adjusting the pH to about 7 to about 8 with an aqueous alkaline reagent.

The acid-active, acid-stable lactase enzyme preparation produced according to the method of the present invention is stable in the range of pH 2-9, exhibits at least about 90 percent of its activity at pH 2.5-5.0 and contains at least about 50,000 Lactase Units (LU) per gram of enzyme preparation.

As used herein, the term Lactase Unit (LU) is defined as that quantity of enzyme which will produce $10^{-8}$ moles of o-nitrophenol (ONP) per minute, at 37° C., pH4.4, at a concentration of o-nitrophenyl-beta-D-galactoside (ONPG) of 0.0005 M.

The assay procedure employed for determining lactase activity is as follows:

DETERMINATION OF B-GALACTOSIDASE (LACTASE) ACTIVITY

Reagents 1.
   a. Stock Buffer: Prepare a McIlvaine phosphate-citrate buffer, 0.1 M, pH 4.4.
   b. Buffer For Use: Dilute 1 part of the stock buffer with 10 parts of water (0.01 M.)
2. Carbonate Solution: 1.1 M sodium carbonate, 0.01 M EDTA, disodium salt.
3. Substrate: o-Nitrophenyl-B-D-galactoside (Mann Research Laboratories, Inc., 136 Liberty Street, New York City). Dissolve 150 mg. ONPG in 100 ml. distilled water. Aliquots of convenient size may be frozen and stored until needed.
4. o-Nitrophenol (Eastman Organic Chemicals, Rochester, New York). Stock Solution (0.001 M): Dissolve 139.11 mg. ONP in 50 ml. ethanol. Dilute to 1000 ml. with distilled water.

Procedure

A. A reference curve is prepared with increments of o-nitrophenol. Dilute 1 part of the ONP stock solution with 9 parts of the 0.01 M buffer. Add from 1 to 10 ml. of the diluted solution, in 1 ml. (0.5 Lactase Unit) increments, to a series of 10 test tubes, and make each tube a final volume of 10 ml. with buffer. Add 1 ml. of carbonate solution to each tube. Determine adsorbance in a colorimeter at 400–420 $\mu$. If a Klett instrument is used, employ No. 42 filter. Plot colorimeter values against moles of ONP per test tube. Since $10^{-6}$ moles of ONP produced under the conditions of the assay correspond to 5 Lactase Units (as hereinbefore defined), the plot can be made of colorimeter readings directly against Lactase Units.

B. The test enzyme dissolved in buffer in a total volume of 9 ml. and containing from 1–5 Lactase Units is added to a test tube. Enzyme solution and substrate are atempered separately at 37° C. Add 1 ml. of substrate to the tube containing the enzyme, mix well, and incubate for exactly 20 minutes. Add 1 ml. of carbonate solution and read in a colorimeter against a substrate blank incubated without enzyme, but otherwise treated in the same manner. If a hazy or colored enzyme solution is used, an enzyme blank must be employed. This can be prepared by incubating the substrate as above and adding the enzyme after the addition of the carbonate solution.

Calculations of Lactase Activity

The activity of the enzyme test solution is determined from the reference curve. The LU of the enzyme preparation is determined by dividing the units in the test by the grams of enzyme in the test.

Example:

If 0.1 mg. of enzyme in the test solution is responsible for the production of $10^{-6}$ moles of ONP under the conditions of the test, this solution contains 5 LU.

$$\text{LU of preparation} = \frac{5 \text{ LU}}{1 \times 10^{-4} \text{ g.}} = 50,000 \text{ LU/g.}$$

The *Aspergillus Niger* used in this invention is a common and well-known species of micro-organism, described in detail by Thom and Raper, "Manual of the Aspergilli," published by Williams & Wilkins Co., Baltimore, 1945, at pages 214 to 240, which are incorporated herein by reference for background information. Illustrative examples of this fungal species are on deposit in stock cultures and available to the public in the permanent collection of the Northern Utilization and Research Division, Agricultural Research Service, U.S. Department of Agriculture, Peoria, Illinois, under accession numbers NRRL 326, NRRL 330, NRRL 334, NRRL 337, NRRL 346 and NRRL 697. Other illustrative examples of this organism are available to the scientific community and other members of the public from the American Type Culture Collective, Rockville, Maryland, under the deposit numbers ATCC 13,496 and ATCC 13,497. It will be understood that the present invention is not limited to the use of these representative examples of *Aspergillus Niger* which are set forth for purposes of illustration and not limitation.

In the production of the lactase enzyme preparation of the present invention, both submerged and surface aerobic fermentation methods are suitable for growth of the *Aspergillus Niger* culture. For example, deep fermentation in commercial fermentation tanks or fermentation in flasks on a rotary shaker, or still and agitated fermentations on semisolid media can be used.

The aerobic fermentation is preferably carried out at temperatures of from about 20° C. to about 40° C. for periods of time of from about 4 to about 7 days.

The fermentation media should contain materials having available carbon, nitrogen and trace nutrients suitable for growth of the *Aspergillus Niger* culture. An aqueous acidified wheat bran preparation containing trace amounts of zinc, iron and copper salts is an example of a preferred fermentation medium. Other fermentation media such as, for example, whey, degraded cornstarch, brewer's yeast, soya protein, casein, ammonium salts and the like materials can also by employed in the fermentation broth.

An example of suitable aerobic fermentation conditions that can be used in the practice of this invention is set forth in example 1 of Cayle, U.S. Pat. No. 3,075,886, which is incorporated herein by reference.

After suitable growth of the culture of *Aspergillus Niger*, the growth product is extracted with water. The aqueous extract can be concentrated if desired, to remove excess water employed during the extraction.

The aqueous extract or a concentrate of the aqueous extract is then slurried with a hydrated aluminum silicate adsorbent. Bentonite, which is a colloidal hydrated aluminum silicate commercially processed from that group of minerals known as the montmorillonites, and kaolin, which is a white clay mineral containing kaolinite as the principal component, are examples of adsorbents which can be used in accordance with the present invention. Other suitable hydrated aluminum silicate adsorbents will be apparent to those skilled in the art after reading this disclosure.

Although the amount of adsorbent used can vary within wide ranges, generally an amount of several percent and even less than 1 percent by weight of the aqueous extract is sufficient to adsorb a substantial proportion of the active lactase component present in the aqueous extract. For example, a slurry of about 10 percent by weight of bentonite added in an amount of from about 2 percent to about 3 percent by weight of aqueous extract has been found to be suitable in the practice of this invention.

The adsorption of the active lactase component with the hydrated aluminum silicate adsorbent generally is carried out at a pH of from about 3 to about 6, although a pH of about 4 is preferred. Acidification to the desired pH is preferably achieved with a weak acid such as, for example, phosphoric acid.

The solid matter or precipitate is separated from the adsorbent slurry, preferably by filtration, and the filter cake is then sparged with water or a mixture of water and acetone or similar such solvent. A mixture of from about 40 percent to about 50 percent weight acetone and a complement of from about 60 percent to about 50 by weight water has been found to be desirable for the sparge treatment.

The active lactase component is then released from the filter cake by treatment with aqueous alkaline reagent in an amount sufficient to adjust the pH to within a range of from about 7 to about 8. Aqueous ammonia is the preferred alkaline reagent for treatment of the filter cake. The filter cake preferably is dispersed in an aqueous medium prior to treatment with the alkaline reagent. The alkaline treated filter cake is the filtered and sparged with water and the combined filtrate and sparge is retained as the active lactase component.

The above filtrate mixture can also be treated by any conventional method for the removal of the water present in the mixture in order to prepare a dry product. For example, such treatment can comprise evaporation, spring drying, freeze drying, and dehydration with salts and/or solvents, and the like methods of drying.

The *Aspergillus Niger* lactase enzyme preparation produced in accordance with the method described herein has an activity of at least about 50,000 LU per gram, and enzyme preparations can be obtained with activities of 500,000 to 600,000 LU per gram by this method.

During the above processing, it is also preferred to treat the aqueous extract or the culture filtrate containing the active lactase component with normally water-soluble calcium compound (i.e., any compound that provides $Ca^{++}$ ions in aqueous solution) at a pH sufficient to produce a precipitate of $Ca(OH)_2$ which is separated therefrom in order to improve the color of the retained lactase enzyme component. The $Ca(OH)_2$ precipitate, which generally forms at about pH6.5 to 6.8, is separated from the retained portion of the aqueous extract or culture filtrate by any conventional means, for example, centrifugation, filtration and the like procedures. This $Ca(OH)_2$ precipitation step can be carried out before or after the adsorption step.

A preferred calcium compound for the above-precipitation is calcium hydroxide. A suitable preparation of calcium hydroxide can be made, for example, by mixing 1 part of lime with 2 parts of water and allowing the resulting slurry to age for about 1 hour. The chemical equivalent of calcium hydroxide can also be prepared from water-soluble calcium ions and a strong alkali such as sodium hydroxide or potassium hydroxide.

The mixture obtained by the treatment of the culture filtrate with the calcium compound is preferably filtered to separate the precipitate. The filter cake is then sparged with water and the combined filtrate and sparge retained as the active lactase component or further processed as hereinbefore described.

A further description of the use of $Ca(OH)_2$ precipitation to improve the color of fungal enzyme culture liquors is found in U.S. Pat. No. 3,134,732, which is incorporated herein by reference for background information.

The following examples will further illustrate the present invention although the invention is not limited to these specific examples. All percentages and parts herein are on a weight basis unless otherwise specified.

EXAMPLE 1

A lactase enzyme preparation having an activity of at least about 50,000 LU per gram is prepared as follows:

To 100 parts of wheat bran was added 60 parts of 0.2 N hydrochloric acid containing 0.62 p.p.m. of $ZnSO_4$, 0.62 p.p.m. of $FeSo_4$ and 0.88 p.p.m. of $CuSO_4$. The mixture was sterilized with steam and, for cooling, was inoculated with a sporulated inoculum of *Aspergillus Niger*. The inoculated bran was maintained at a temperature of 30° C. by passing moist air through the mixture until testing indicated the presence of substantial quantities of lactase after growth for 4 days.

An aqueous extract of the growth product was prepared by washing the above mixture with 4 volumes of water. The extract was concentrated by evaporation to a specific gravity of 1.1.

A masons lime slurry was prepared by mixing 1 part lime with 2 parts of water. The slurry was allowed to stand for 1 hour with occasional stirring.

The lime slurry was added to the evaporate of the aqueous extract from the preceding step in increments, with stirring after each addition, until the pH of the mixture was between 6.5 and 6.8. Stirring was continued for an additional 30 minutes and the mixture was then filtered. The filter cake was sparged with 25° C. tap water, using about one-third part water based on the weight of the initial evaporate of the aqueous extract.

The combined filtrate and sparge was then mixed with bentonite by adding a 10 percent slurry of bentonite in an amount of 3 percent by weight of the total filtrate and sparge. Dilute phosphoric acid was added to the mixture with stirring until the pH was in the range of 3.9 to 4.1. Stirring was continued for an additional 30 minutes and the mixture was then filtered.

The filter cake was sparged with a mixture of 45 parts of acetone and 55 parts of water at 25° C. until the effluent was essentially colorless. The filter cake was then transferred to a mixing tank and mixed well with 2 parts by weight of tap water to thoroughly disperse the filter cake. Ammonium hydroxide was added to the mixture until the pH was about 7. Stirring was continued for an additional 30 minutes after the pH adjustment and the mixture was then filtered and sparged with tap water.

The combined filter and sparge from the preceding step was dehydrated, with care being taken to maintain a temperature not exceeding 25° C. and a pH in the range of 6 to 7 during the evaporation. The final dry product was assayed and found to contain greater than 50,000 LU per gram, to be stable in the range of pH 2–9 and to exhibit at least 90 percent of its activity at pH 2.5–5.0.

EXAMPLE 2

Example 1 is repeated except that the final dry product is further treated by the addition of dilute phosphoric acid until the pH is in the range of 3.9 to 4.1. The solids which separate during the acidification are filtered off and the filtrate is retained as the active lactase-containing preparation.

EXAMPLE 3

The final products of examples 1 and 2 above, are further treated by adjustment of the pH to within a range of 5.8 to 6.2 with dilute ammonium hydroxide or dilute phosphoric acid, as required, and by spray drying at a final temperature of 60°–65° C. The final dry products were assayed and found to contain greater than 200,000 LU per gram.

EXAMPLE 4

Example 1 is repeated except that a Georgia Kaolin-Hydrite MP adsorbent in the amount of 5 percent by weight of the combined filtrate and sparge from the Ca(OH)$_2$ precipitation step is employed in place of bentonite with substantially equivalent production of lactase.

Various other examples of the invention and modifications and adaptations of the foregoing examples will be apparent to the person skilled in the art after reading the foregoing specification and the appended claims without departing from the spirit and scope of the invention. Thus, various other aerobic fermentation conditions employing other conventional growth media, longer or shorter growing periods, and different temperature and pH conditions than specifically described herein will be apparent. And one or more of the following additional purification steps can also be employed in combination with the lactase production method herein defined after suitable growth of the culture of *Aspergillus Niger:* fractional precipitation with ammonium sulfate and other salts, selective adsorption and elution on calcium phosphate gels, differential heat inactivation of contaminating proteins at varying pH's, isoelectric precipitation, organic solvent precipitation with solvents other than acetone, for example, ethanol, gel filtration such as through a "Sephadex" gel column, and ion exchange separation on columns of cellulose derivatives, for example, CMC and DEAE. All such further examples, modifications and adaptations are included within the scope of the appended claims.

What is claimed is:

1. A method for the production of an acid-active, acid-stable lactase enzyme preparation exhibiting 90 percent of its activity at pH 2.5–5, which method comprises growing a culture of *Aspergillus Niger* under aerobic fermentation conditions, extracting the growth product with water, slurrying the extract with a hydrated aluminum silicate adsorbent at a pH portion of from about 3 to about 6 to adsorb said active lactase component, separating the precipitate and releasing said active lactase component from said precipitate by adjusting the pH to about 7 to about 8 with an aqueous alkaline reagent.

2. The method of claim 1 in which the hydrated aluminum silicate is bentonite.

3. The method of claim 1 in which the hydrated aluminum silicate is kaolin.

4. The method of claim 1 in which the slurrying with the adsorbent is carried out at a pH of about 4.

5. The method of claim 1 in which the aqueous alkaline reagent is ammonium hydroxide.

6. The method of claim 1 in which the precipitate from the adsorbent slurry is washed with an aqueous acetone mixture containing from about 40 percent to about 50 percent by weight of acetone.

7. The method of claim 1 in which the hydrated aluminum silicate is bentonite, the slurrying with the adsorbent is carried out at a pH of about 4, the precipitate from the adsorbent slurry is washed with an aqueous acetone mixture containing from about 40 percent to about 50 percent by weight of acetone and the aqueous alkaline reagent is ammonium hydroxide.

8. The method of claim 1 in which the hydrated aluminum silicate is kaolin, the slurrying with the adsorbent is carried out at a pH of about 4, the precipitate from the adsorbent slurry is washed with an aqueous acetone mixture containing from about 40 percent to about 50 percent by weight of acetone and the aqueous aqueous reagent is ammonium hydroxide.

9. The method of claim 1 including the additional step of precipitating the aqueous extract with Ca(OH)$_2$ and separating the precipitate therefrom.

10. The method in claim 9 in which the hydrated aluminum silicate is bentonite.

11. The method of claim 9 in which the hydrated aluminum silicate is kaoline.

12. The method of claim 9 in which the slurrying with the adsorbent is carried out at a pH of about 4.

13. The method of claim 9 in which the aqueous alkaline reagent is ammonium hydroxide.

14. The method of claim 9 in which the precipitate from the adsorbent slurry is washed with an aqueous mixture containing from about 40 to about 50 percent by weight of acetone.

15. The method of claim 9 in which the hydrated aluminum silicate is bentonite, the slurrying with the adsorbent is carried out at a pH of about 4, the precipitate from the adsorbent slurry is washed with an aqueous acetone mixture containing from about 40 to about 50 percent by weight of acetone and the aqueous alkaline reagent is ammonium hydroxide.

16. The method of claim 9 in which the hydrated aluminum silicate is kaolin, the slurrying with the adsorbent is carried out at a pH of about 4, the precipitate from the adsorbent slurry is washed with an aqueous acetone mixture containing from about 40 to about 50 percent by weight of acetone and the aqueous alkaline reagent is ammonium hydroxide.

* * * * *

UNITED STATES PATENT OFFICE
CERTIFICATE OF CORRECTION

Patent No. 3,620,924  Dated November 16, 1971

Inventor(s) Muerner S. Harvey and Frederick W. Viebrock

It is certified that error appears in the above-identified patent and that said Letters Patent are hereby corrected as shown below:

In the specification, at col. 1, line 30, cancel "coil" and insert --coli--, in line 62, cancel "and" and insert --an--; at col. 2, line 2, cancel "$10^{'7E'8}$" and insert --$10^{-8}$--, at line 34, cancel "$\mu$" and insert --$m\mu$--, at lines 37 and 61, cancel "$10^{'7E'6}$" and insert --$10^{-6}$--; at col. 3, line 4, cancel "Collective" and insert --Collection--, in line 68, after "50 percent" insert --by--; at col. 4, line 3, cancel "the", first instance, and insert --then--, at line 8, cancel "spring" and insert --spray--, at line 60, cancel "for" and insert --after--.

In the claims, at col. 6, line 12, cancel --portion--, in line 40, "aqueous", second occurrence, should read -- alkaline --; line 47, "kaoline" should read -- kaolin --.

Signed and sealed this 13th day of June 1972.

(SEAL)
Attest:

EDWARD M. FLETCHER, JR.   ROBERT GOTTSCHALK
Attesting Officer         Commissioner of Patents